(12) United States Patent
Lanzl

(10) Patent No.: US 10,267,014 B2
(45) Date of Patent: Apr. 23, 2019

(54) BOLT CONNECTION AND SWIVEL LEVER WITH BOLT CONNECTION FOR CONSTRUCTION MACHINE

(71) Applicant: BAUER Maschinen GmbH, Schrobenhausen (DE)

(72) Inventor: Martin Lanzl, Ingolstadt (DE)

(73) Assignee: BAUER Maschinen GmbH, Schrobenhausen (DE)

( * ) Notice: Subject to any disclaimer, the term of this patent is extended or adjusted under 35 U.S.C. 154(b) by 0 days.

(21) Appl. No.: 15/583,865

(22) Filed: May 1, 2017

(65) Prior Publication Data

US 2017/0328027 A1 Nov. 16, 2017

(30) Foreign Application Priority Data

May 11, 2016 (EP) .................................... 16169187

(51) Int. Cl.
| | |
|---|---|
| *E02F 3/36* | (2006.01) |
| *E02F 9/00* | (2006.01) |
| *F16C 11/04* | (2006.01) |
| *F16B 41/00* | (2006.01) |
| *F16C 11/02* | (2006.01) |
| *F16B 37/14* | (2006.01) |

(52) U.S. Cl.
CPC ............ *E02F 3/3636* (2013.01); *E02F 9/006* (2013.01); *F16C 11/045* (2013.01); *F16B 37/14* (2013.01); *F16B 41/002* (2013.01); *F16C 11/02* (2013.01)

(58) Field of Classification Search
CPC ....... E02F 3/3609; E02F 3/369; E02F 3/3645; E02F 3/627; F16B 41/002

USPC ......................................................... 414/723
See application file for complete search history.

(56) References Cited

U.S. PATENT DOCUMENTS 5,256,026 A * 10/1993 Kishi .................... E02F 3/3631
403/321
6,241,455 B1   6/2001 Schupback et al.
(Continued)

FOREIGN PATENT DOCUMENTS

| CN | 101243229 A | 8/2008 |
|---|---|---|
| DE | 196 51 507 A1 | 7/1997 |

(Continued)

OTHER PUBLICATIONS

The extended European search report issued by the European Patent Office dated Nov. 11, 2016, which corresponds to EP16 16 9187.
(Continued)

*Primary Examiner* — Ronald P Jarrett
(74) *Attorney, Agent, or Firm* — Studebaker & Brackett PC

(57) ABSTRACT

The invention relates to a bolt connection with a bearing bolt, in particular for a construction machine, in particular for underground engineering and for a swivel lever, in particular for a construction machine, which connects a first component and a second component pivotably to each other, wherein the bearing bolt extends through at least one first bearing eye on the first component and at least one second bearing eye on the second component, and wherein the bearing bolt can be driven, for releasing the connection, on an exit side out of the first bearing eye and the second bearing eye. At the exit side a protective receptacle is arranged, which is designed to receive and hold the driven-out bearing bolt.

16 Claims, 4 Drawing Sheets

(56) References Cited

U.S. PATENT DOCUMENTS

| | | | | |
|---|---|---|---|---|
| 6,332,747 B1* | 12/2001 | Lee | ................... | E02F 3/3636 |
| | | | | 37/468 |
| 7,171,289 B1* | 1/2007 | Tamez | ................. | B62D 53/068 |
| | | | | 340/431 |
| 2007/0235201 A1* | 10/2007 | Gharsalli | ................ | E02F 3/764 |
| | | | | 172/4.5 |
| 2009/0127218 A1* | 5/2009 | Hylen | ................... | E02F 3/38 |
| | | | | 212/292 |

FOREIGN PATENT DOCUMENTS

| EP | 1 980 672 A1 | 10/2008 |
|---|---|---|
| GB | 2 511 534 A | 9/2014 |
| JP | 2005-133507 A | 5/2005 |

OTHER PUBLICATIONS

An Office Action issued by the Chinese Patent Office dated Nov. 1, 2018, which corresponds to Chinese Patent Application No. 201710329632.6 and is related to U.S. Appl. No. 15/583,865; with English language translation.

\* cited by examiner

BOLT CONNECTION AND SWIVEL LEVER WITH BOLT CONNECTION FOR CONSTRUCTION MACHINE

The invention relates to a bolt connection with a bearing bolt. Such a bolt connection with a bearing bolt connects a first component and a second component pivotably to each other, wherein the bearing bolt extends through at least one first bearing eye on the first component and at least one second bearing eye on the second component, and wherein the bearing bolt can be driven towards an exit side, out of the first bearing eye and the second bearing eye to release the connection.

The invention further relates to a construction machine.

The invention also relates to a swivel lever, which is designed to receive an actuating cylinder, in particular to hold a mast.

Known bolt connections have at least two components, connected to each other like a hinge, which are connected by means of a bolt. In order to prevent the bolt from changing position or slipping out of the bolt connection, the bolt is provided in the known way, preferably at both sides of the bolt, with a pin lock. When driving the bolt into and out of such a bolt connection, each of the bolts must be individually knocked into the bolt connection or knocked out of the bolt connection.

Since, when releasing a bolt connection, in particular in construction machines, it can be the case in principle that one of the released components or the bolt itself falls down, it is regarded as disadvantageous for staff to be in proximity to the device when releasing or closing a bolt connection. Furthermore it is regarded as disadvantageous that according to the known methods for providing or releasing a plurality of bolts, considerable down times of the construction machine can arise.

When driving in the bolts, there is in principle the risk that a bolt does not completely close the bolt connection, a bolt has not been properly secured or a pin lock subsequently detaches from the bolt again. This represents a considerable safety risk, which has not been given consideration satisfactorily up to now.

It is the object of the invention to indicate a bolt connection with a bearing bolt in particular for a construction machine and a swivel lever for a construction machine, which allows reliable and efficient opening and closing of the bolt connection, wherein a particularly high operating safety of the bolt connection is guaranteed.

The bolt connection according to the invention with a bearing bolt is characterised in that a protective receptacle is arranged at the exit side, which is designed to receive and accommodate the bearing bolt that has been driven out.

It is a core idea of the present invention to provide a bolt for a bolt connection that is assigned at least to the first component already before the connection of the components, wherein the bearing bolt is advantageously orientated with respect to the bearing eye of the first component. For this, a protective receptacle can be provided, which is designed to hold the bearing bolt and accommodate it securely. The bearing connection according to the invention has at least one bearing bolt and at least two components to be connected to the bearing bolt.

According to a refinement of the invention it is preferred that the bearing bolt is arranged in the protective receptacle coaxially to the first bearing eye after the connection has been released. The protective receptacle can be arranged in particular on the first component, preferably at the exit side of the bearing piston. The exit side is a side, at which the bearing bolt can leave the bolt connection. The protective receptacle can be formed with an inner space, in which the bearing bolt can be provided, when a bolt connection is released, in particular directly over the bearing eye. Accordingly the protective receptacle can have an exit opening which is arranged in particular above the first bearing eye. The protective receptacle can be designed to prevent damage and/or soiling of the bearing bolt that can hinder operation. Such damage or soiling can in particular contribute to a positive locking connection between the bolt and the bearing eye being insufficiently produced in the bolt connection. In particular the protective receptacle is designed to prevent the bearing bolt from falling out of the bolt connection and/or the protective receptacle.

According to a particularly useful refinement of the invention it is provided that the bearing bolt is designed as a step bolt and has an area with a smaller diameter, which is formed at a side facing away from the protective receptacle, and an area with a larger diameter, which is formed at a side facing towards the protective receptacle. The step bolt can be provided in particular with a stepped form along a cylinder rotation axis of the bearing bolt. The bearing eyes of the first and second component can have a corresponding diameter that corresponds, when the bolt connection has been produced, substantially to the corresponding axial section of the bearing bolt, which is in contact with the bearing eye. Bearing eyes of different diameters can therefore be provided for the bolt connection, wherein the diameter of the bearing eyes can decrease with increasing distance from the protective receptacle, thus in the entry direction of the bolt. The step bolt can thus have, in the contact area with the respective bearing eye, a radius that is substantially equal thereto. Through the stepped form of the bearing bolt, it is possible to prevent the bolt from falling out of the bolt connection at a side facing away from the protective receptacle. It can hereby be advantageous that at least the bearing eye that is furthest from the protective receptacle is penetrated by an area of the bearing bolt, when the bolt connection is closed, wherein the bearing eye is in contact with an adjacent area of the bearing bolt having a larger diameter. Displacement of the bearing bolt in the bolt connection can be prevented at least towards the exit side, which faces away from the protective receptacle.

For a particularly secure bolt connection it is provided according to a refinement of the invention that a position-securing means is arranged at the bolt connection, which can be adjusted radially on the bearing bolt. The position-securing means can be designed in particular to fix the bearing bolt in fixed position with respect to an undesirable displacement along its cylinder or stepped cylinder axis. The position-securing means can preferably be provided at a side of the bolt connection lying opposite the protective receptacle. In particular for a bolt connection which has at least two bearing eyes on the first component and at least two bearing eyes on the second component, the position-securing means can also be provided between two bearing eyes of the bolt connection, in particular between two of the bearing eyes of the second component. If such a position-securing means is provided between two of the bearing eyes, the position-securing means can prevent slipping or displacement of the bearing bolt along its cylinder axis in both directions.

It is particularly preferred according to a refinement of the invention that the position-securing means has a securing element, which engages with positive locking in a recess on the bearing bolt. Such a position-securing means can be for example a pin lock, which can engage in a corresponding retaining groove, in particular in a radial depression of the bearing bolt. After engagement in the bolt recess, the pin lock can be fixed on one of the components, in particular being tensioned via a screw joint. If a plurality of bearing eyes are provided on the respective components, the securing element can also be provided in an area between the bearing eyes. The position-securing means is preferably designed in particular between the bearing eyes in the form of a radially adjustable security stamp or punch. The stamp can have in particular a profile that corresponds substantially to a corresponding profile in the area of the bearing bolt to be secured. Before releasing the bearing bolt from the bolt connection and feeding the bearing bolt to the protective receptacle, it can be useful to release the at least one position-securing means from the bearing bolt.

Both the feeding of the position-securing means to the bearing bolt and also the release of the position-securing means from the bearing bolt can be realised both manually and also mechanically, in particular by a hydraulic mechanism. In particular in the case of a hydraulically driven position-securing means, a hydraulic cylinder can be provided, in which a piston is arranged, which has on the end face a security stamp. The security stamp can be adjusted relative to the bearing bolt by means of the hydraulically driven piston in order to facilitate a fixed-position securing of the bearing bolt.

According to a particularly advantageous refinement of the invention it can be provided that an adjusting member is arranged at the protective receptacle, which is designed to change the position of the bearing bolt between the bolt connection and protective receptacle. By means of the adjusting member the bearing bolt can be guided between the bolt connection and the protective receptacle. The adjusting member can prevent in particular an undesired change in the position of the bearing bolt with respect to the bearing eyes. The adjusting member can retain the bearing bolt for example in the protective receptacle, whereby a random feeding of the bearing bolt at least in a first direction out of the protective receptacle towards the bolt connection is prevented. Furthermore the adjusting member can contribute to hold the bearing bolt in position in the bolt connection. The bearing bolt can advantageously be connected to the adjusting member.

It is particularly preferred for a hydraulic cylinder to be arranged on the adjusting member, by means of which the adjusting member can be changed in its position. The bearing bolt can thus be connected via the adjusting member to the hydraulic cylinder and be driven via this. The hydraulic cylinder can be formed as a dual cylinder, which can facilitate both feeding and extracting the bearing bolt from the bolt connection. The hydraulic cylinder can hold the adjusting member in a first position, in which the bolt is arranged in the protective receptacle. By maintaining a corresponding hydraulic pressure in the hydraulic cylinder, the bolt can be provided fixed in position in the protective receptacle, wherein the bearing bolt can be prevented from falling out of the protective receptacle. In particular by reversing the hydraulic pressure in the hydraulic cylinder, the adjusting member can be moved out of the first position into a second position, whereby the bearing bolt can be fed to the bolt connection.

It is particularly preferred that the bolt and/or the adjusting member has/have a guide member, which guides at least a removal of the bearing bolt out of the protective receptacle into the bolt connection in an axial direction of the bearing bolt coaxially to the bearing eyes of the bolt connection. The guide member can preferably be guided in an area of the protective receptacle, which can have a limiting stop, which adjustably limits the guide member in its deflection in a defined way. An outward movement of the bearing piston out of the protective receptacle as far as a defined point can be set, which can facilitate a precise adjustment of the bearing bolt to the bolt connection. The above explanations can also apply to the inward movement of the bolt into the protective receptacle.

The bearing bolt preferably passes through all bearing eyes of the components of the bolt connection to be connected if the bolt guide reaches the stop. It is particularly preferred that the bearing bolt projects at a side lying opposite the protective receptacle out of the bolt connection. In particular in the projecting part of the bearing bolt, a recess for a position-securing means of the bolt can be provided, which can prevent an undesired pulling-back of the bearing bolt into the protective receptacle.

According to a preferred refinement of the invention it can be provided that a first position sensor is provided on the bolt connection, which is designed to determine the position of the bearing bolt in the bolt connection. The position sensor can be designed in particular to detect a completely produced bolt connection, in which the bolt assumes a previously defined position. The position sensor can differentiate the defined position of the bearing bolt in the bolt connection from at least one other bearing bolt position in the axial direction along the cylinder axis of the bearing bolt. The first position sensor can be connected to a control module, which allows a use of the bolt connection or the construction machine, on which the bolt connection can be provided, only when the control module receives a signal at least from the first position sensor that corresponds to a complete production of the bolt connection.

A completed bolt connection can be constituted in particular when the bearing bolt completely penetrates through all bearing eyes of the bolt connection and is in positive locking contact with these. The first position sensor can be designed in particular with a contact element, which is in contact with the bearing bolt particularly when the bolt connection is produced. With a correspondingly predefined contact between the contact element of the first position sensor and the bearing bolt, the first position sensor can transmit a signal to the control module, which determines the complete production of the bolt connection, and releases the bolt connection or the construction machine that has the bolt connection for operation. A user signal can also be produced by the control module, which indicates that the bolt connection has been completely produced.

For a particularly secure production of the bolt connection it is provided according to a refinement of the invention that a second position sensor is provided on the bolt connection, which is designed to determine a coaxial position of the at least one bearing eye relative to the at least one second bearing eye. The second position sensor can be provided in particular on the first component and have a contact element, which can determine, through direct contact or indirectly, for example via a contact stamp, the position of the second component relative to the first component, in particular before producing the bolt connection. As soon as the second component is arranged in the area of the bolt connection to be produced, it can be in contact with the contact element of the second position sensor and determine a position of the second component relative to the first component.

It is particularly preferred according to a refinement of the invention that the second position sensor is connected to a control module which is designed to release the bearing bolt, only after a coaxial orientation of the at least one first bearing eye and the at least one second bearing eye, for adjustment of the bearing bolt to the bolt connection. The second position sensor can be connected to the same control module as the first position sensor. Before the release approval for the adjustment of the bearing bolt to the bolt connection by the control module, the bearing bolt in the protective receptacle can be prevented, for example by locking the hydraulic cylinder, which actuates the adjusting member, from being fed out of the opening of the protective receptacle at least to the first bearing eye. A protective plug or another mechanical block can also be provided, which prevents the exit of the bearing bolt out of the opening of the protective receptacle. In particular the second position sensor can transmit a signal to the control module that the second component is in a defined position relative to the first component. Preferably, the second position sensor can transmit a signal to the control module that the bearing eyes of the first component and of the second component are orientated coaxially to each other. As soon as the second position sensor transmits a signal to the control module, which corresponds to a coaxial position of the bearing eyes of the first component and the second component, the locking of the bolt can be released by the control module, whereby the bearing bolt can be moved without hindrance out of the protective receptacle of the bolt connection.

The construction machine according to the invention can preferably have a mast which is arranged pivotably on a support device with at least one bolt connection. The bolt connection can be arranged in particular in a lower area of the mast, whereby the mast is arranged in a hinged manner on the construction machine. In particular the mast can be pivotable by means of the bolt connection between a horizontal position and a vertical position.

The swivel lever can be provided on the construction machine in particular to connect a mast to the construction machine via at least one actuating cylinder. For this, the swivel lever can be provided on the construction machine and can have at least one reception for at least one actuating cylinder, which can be attached both to the swivel lever and also to the mast on the end side in each case. A guided pivoting of the mast between for example the horizontal position and the vertical position can hereby be facilitated. Furthermore the swivel lever can provide the mast with an adjustable angle of inclination, which can be adjusted in a defined way, on the construction machine in a fixed position. The bolt connection according to the invention can hereby facilitate a reliable, hinged attachment of the actuating cylinder to the construction machine.

The invention will be explained in further detail below by reference to the attached, schematic drawings, in which.

Figure 1:
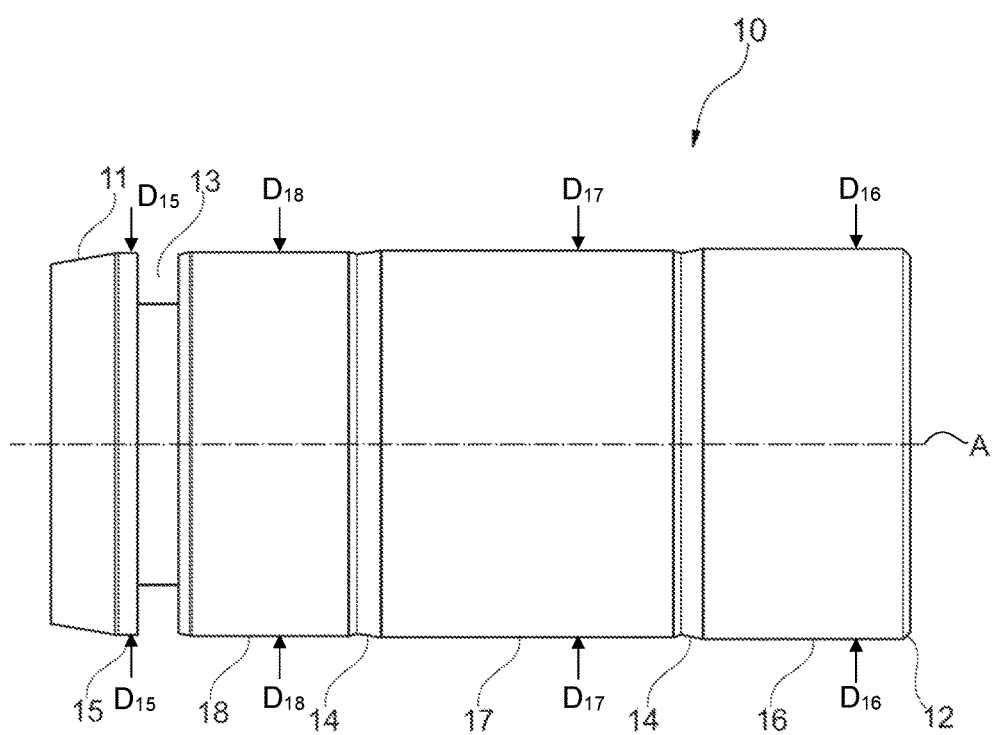
FIG. 1 shows a bearing bolt for a bolt connection according to the invention.
Figure 2:
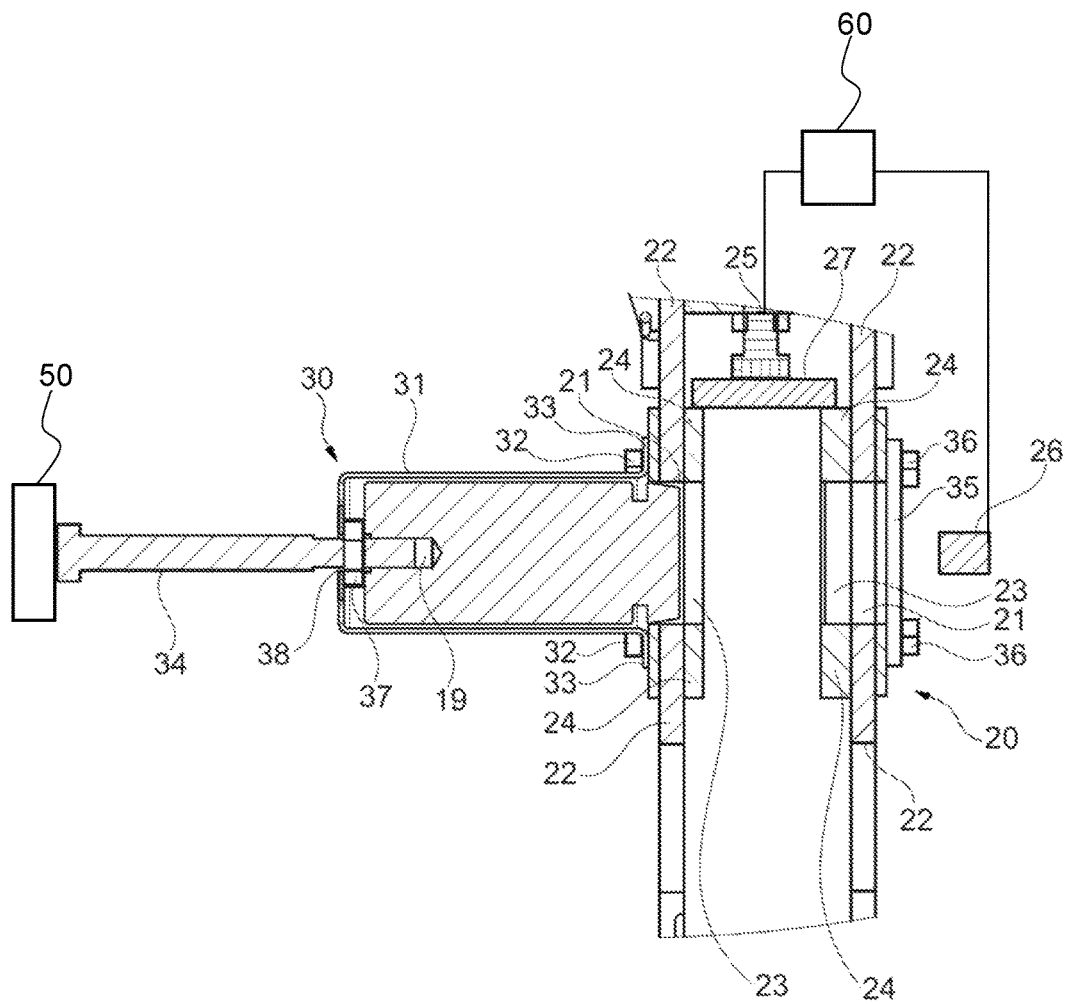
FIG. 2 shows an open bolt connection according to the invention with protective receptacle with a bearing bolt in a first position.
Figure 3:
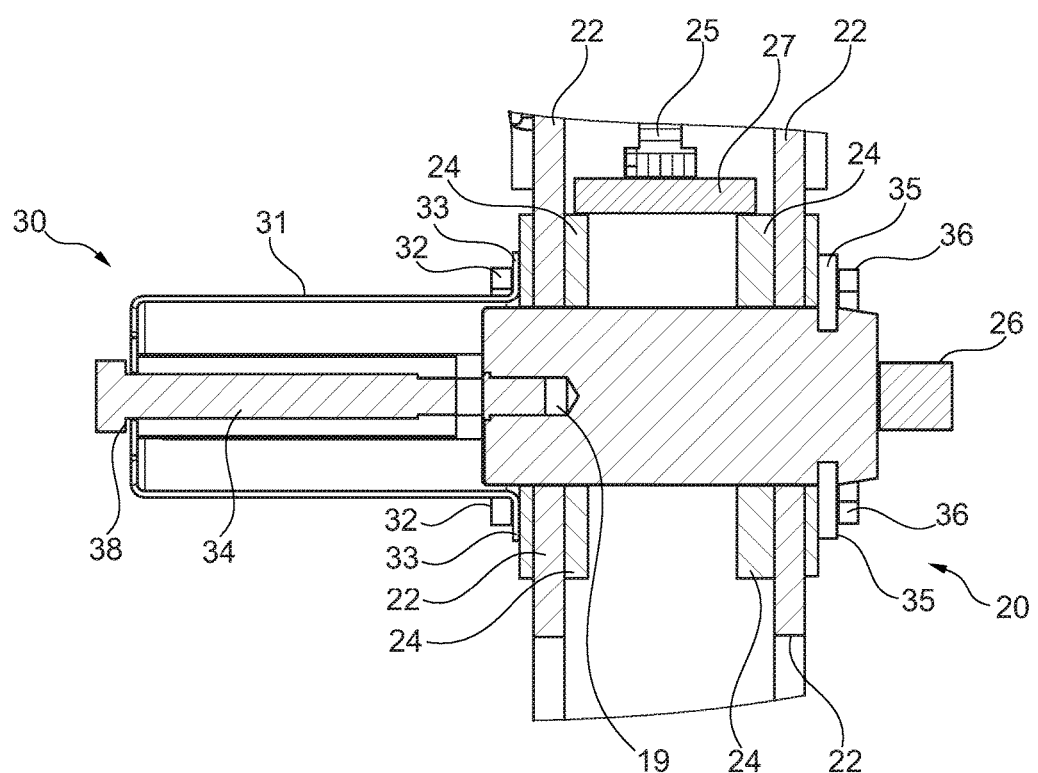
FIG. 3 shows a closed bolt connection according to the invention with protective receptacle with a bearing bolt in a second position.

FIG. 1 shows a bearing bolt 10 for a bolt connection 20 according to the invention, as shown in FIGS. 2 and 3. This can have a conical area 11 which can be provided in a front area of the bearing bolt. Along the bearing bolt 10, a cylindrical area 15 can be attached to the conical area 11, which can form, together with the conical area 11, a top area of the bearing bolt 10. The bearing bolt 10 can have a base body, which can be formed in particular in three parts. Such a bearing bolt base body formed in three parts can have a first area 16, which is provided at a rear end 12 of the bearing bolt 10. A middle area 17 can be attached to the rear area 16, the middle area 17 being provided between the rear area 16 and a front area 18 of the bearing bolt base body.

Step-form depressions can be provided between the individual areas of the bearing bolt base body 16, 17 and 18, which can be formed as profiled depressions or profiled transition areas 14. In particular the diameter of the individual areas 16, 17 and 18 of the bearing bolt base body can decrease from the rear to the front. Accordingly a rear area 16 of the bearing bolt base body can have a large diameter $D_{16}$, the middle area 17 of the bearing bolt base body may have a middle diameter $D_{17}$ and the front area 18 may have a small diameter $D_{18}$. The diameter of the cylindrical area 15 can in particular be designed with the same diameter as the front area 18 of the bearing bolt base body, but can also be formed with a smaller diameter $D_{15}$. A retaining groove 13 can be provided between the bearing bolt base body and a bearing bolt head, which can have in particular the front conical area 11 and the front cylindrical area 15, in which groove a position-securing means or pin lock can engage in a positive locking manner. The pin lock can be adjusted to the retaining groove 13, in particular radially. The profiled transition areas 14 along the bearing bolt base body can be designed in particular to receive a position-securing means of the bolt 10 in a bolt connection, whereby a displacement of the bearing bolt 10 in the bolt connection along at least one axial direction, in particular along the longitudinal axis A of the bearing bolt, can be prevented. The bearing bolt 10 according to FIG. 1 is still at least in the first bearing eye, while the bearing bolt is provided in the protective receptacle. The bearing bolt can, however, easily be provided such that it is pulled back from all bearing eyes in its withdrawal position in the protective receptacle 30.

FIG. 2 shows a bolt connection 20 according to the invention. This has a first component 22 and a second component 24. At least one first bearing eye 21 can be provided on the first component 22 and at least one second bearing eye 23 on the second component 24. According to FIG. 2, the bearing eyes 21, 23 of the first component and the second component are coaxially orientated and the bolt connection 20 is open, wherein the bearing bolt 10 does not connect the first component 22 and the second component 24 to each other. The bearing bolt 10 can be provided according to FIG. 2 in a protective receptacle 30 which can be provided on an outer side of the first component 22. The protective receptacle 30 can have in particular a housing 31 which can cover the bearing bolt 10 along the cylinder jacket at least in areas, preferably completely. The bearing bolt 10 can hereby be secured against falling out of the protective receptacle 30 sideways. The housing 31 of the protective receptacle 30 can be provided in a fixed position on the first component via a connection area 33. The connection area 33 is preferably formed parallel to the first component 22. To secure the protective receptacle 30, a connection element 32, in particular in the form of a screw or notch, can be provided, which can securely connect the connection area 33 and the first component 22 to each other. The protective receptacle 30 can be welded onto the first component 22.

In an area of the protective receptacle 30 facing away from the first component 22, an adjusting member 34 can be provided which can be fed through an opening 38 in the housing 31 to the bearing bolt 10. The bearing bolt 10 can be formed in particular with a recess 19. This can also be formed on a side of the bearing bolt facing away from the first component 22. The adjusting member 34 can engage with a front end in the recess 19 on the bearing bolt 10. The adjusting member 34 can hereby be formed with a stamp 37, which can be arranged axially adjustably on the adjusting member 34. The stamp 37 can be provided on the adjusting member 34 so that it can be changed in its position and can be formed for example with an internal thread which can be provided on the adjusting member 34 along an external thread of the adjusting member 34 in an accurate position.

By means of the axially adjustable stamp 37, an adjusting depth of the bearing bolt 10 out of the protective receptacle 30 in the direction of the bolt connection 20 can be defined. In this way, in particular the position of the bearing bolt 10 in the protective receptacle and bolt connection can be set. The adjusting member 34 can be fed in particular through the opening 38 to the inner area of the protective receptacle 30, wherein, with successive feeding of the adjusting member 34, the bearing bolt 10 can be fed to the coaxially orientated bearing eyes 21, 23 of the first and second component.

On one of the sides of the open bolt connection 20 lying opposite the protective receptacle 30, a pin lock 35 can be provided, which has a pin lock fixing means 36. The pin lock fixing means 36 can be provided in particular in the form of a screw connection or another, preferably releasable, connection on the first component. In the area of the bolt connection 20 which faces away from the protective receptacle 30, a first position sensor 26 can be provided which can determine the position of the bearing bolt 10 in the bolt connection 20.

In an area above the bearing eyes 21, 23, a second position sensor 25 can be provided, which can be designed in particular to determine the position of the second component in relation to the first component. The second position sensor 25 can be designed in particular to determine a coaxial orientation of the bearing eyes 21, 23 of the first component 22 with the second component 24. On the second position sensor 25, a stamp 27 can be provided, which comes into contact in particular with the second component 24 when the first component 22 is orientated with respect to the second component 24. The stamp 27 can be arranged on a contact element of the second position sensor 25 and can adjust this in particular during coaxial orientation of the components 22, 24. The relative position of the second component 24 with respect to the first component 22 can hereby be determined. For this, the second position sensor 25 can be provided in particular on the first component.

FIG. 3 shows a bolt connection 20 according to the invention, wherein the bearing bolt 10 passes through the first component 22 and the second component 24 and connects them to each other. The bearing bolt 10 is provided with positive locking in the bearing eyes 21, 23 according to FIG. 2. The bearing bolt 10, which is preferably formed as a step bolt, can respectively have substantially a same radius in the individual areas of the cylinder jacket as the bearing eye, with which the area is in contact.

Adjacent bearing eyes 21, 23 of the first component 22 and the second component 24 are particularly preferably in contact with an area of the bearing bolt 10 with an equal diameter. The bearing bolt 10 according to FIG. 3 has been fed with respect to FIG. 2 by means of the adjusting member 34 out of the protective receptacle 30 in an axial direction to the coaxially orientated bearing eyes 21, 23. As follows from FIGS. 2 and 3, the first component 22 and the second component 24 can be formed in multiple parts, wherein each of the components can have more than one bearing eye. The adjusting member 34 can have, in an end area facing away from the bearing bolt 10, an edge area, which has a larger diameter than the opening 38 in the housing 31 of the protective receptacle 30, whereby the movement of the adjusting member 34 into the housing 31 can be limited in its depth. By a pre-setting of the stamp 37 on the adjusting member 34 according to requirements, a position of the bearing bolt 10 can be set in a defined way when the adjusting member 34 has been completely introduced.

When an adjusting member 34 has been completely introduced the end area of the adjusting member 34, with a larger diameter, can be in contact with the housing 31 of the protective receptacle 30, whereby a further movement of the adjusting member 34 is prevented.

According to FIG. 3, the bearing bolt 10 of the bolt connection 20 is completely fed. In this position the bearing bolt 10 can be secured by means of the pin lock 35 with respect to an axial displacement of the bearing bolt 10. To secure the pin lock 35, at least the pin lock fixing means 36 can be provided, which provides the pin lock 35 in a fixed position on the first component 22.

By means of the first position sensor 26, an axial position of the bearing bolt 10 can be determined. The first position sensor 26 and the second position sensor 25 can be connected to a control module 60 (FIG. 2).

When the bolt connection 20 is produced and when the bolt connection is closed, the first position sensor 26 and the second position sensor 25 can transmit position data of the components 22, 24 relative to each other and the position of the bearing bolt 10 relative to the bolt connection 20 to the control module. The control module can be designed to allow movement of the bearing bolt 10 to the bolt connection 20, or output a request for movement of the bolt 10, only when the second position sensor 25 transmits a position signal of the at least second component 24 relative to the first component 22, which corresponds to an axial orientation of the at least one first bearing eye 21 and the at least one second bearing eye 23.

As soon as a coaxial orientation of the at least one first bearing eye 21 and the at least one second bearing eye 23 has been detected by the control module, a signal can be transmitted to the operator of the construction machine that the bearing bolt can be fed to the bolt connection 20. Alternatively, a corresponding signal can also be transmitted to the adjusting member 34 to carry out feeding of the bearing bolt 10 to the bolt connection 20. For this, the adjusting member 34 can be moved mechanically or hydraulically, in particular via a hydraulic piston or a hydraulic cylinder 50 (FIG. 2). The adjusting member 34 can be fed without manual intervention on the bolt connection 20 to the housing 31 and the bearing bolt 10 can be pushed out of the protective receptacle 30 into the bolt connection 20. As soon as the first position sensor 26 detects, when feeding the bearing bolt 10 to the bolt connection 20, a defined position of the bearing bolt 10, it can transmit a signal to the control module that the bearing bolt 10 has been properly fed and the bolt connection 20 has been produced. Subsequently a securing of the bolt connection can be realised.

The mechanical device, in particular the hydraulic piston, can also be designed to at least partially pull the adjusting member 34 out of the housing 31 again. With the adjusting member 34, the bearing bolt 10 connected to the adjusting member 34 can also be fed to the protective receptacle 30 out of the bolt connection 20 again. For this, in particular a hydraulic dual cylinder can be provided, which can be designed both for entry and also removal of the adjusting member 34 from the housing 31 of the protective receptacle 30.

Figure 4:
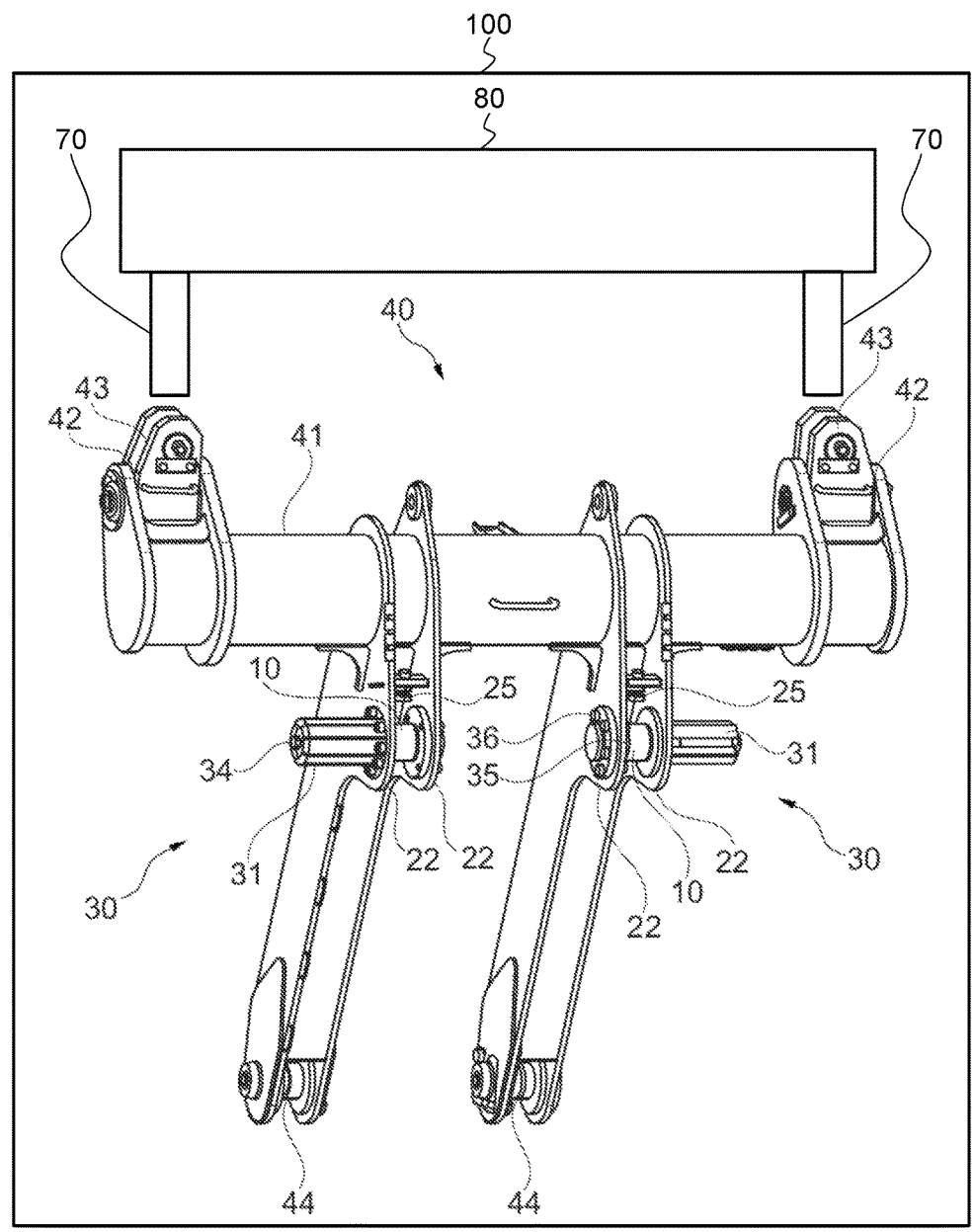
FIG. 4 shows a swivel lever with two bolt connections according to the invention.

FIG. 4 shows a swivel lever 40, on which at least one protective receptacle 30 according to the invention can be arranged. The protective receptacle 30 is shown according to FIG. 4 without a hydraulic piston or another mechanical device for adjusting the adjusting member 34, but can have these. The protective receptacle 30 is arranged on a first component 22, wherein the piston 10 has travelled out of the protective receptacle 30 and is secured via the pin lock 35 with the pin lock fixing means 36 with respect to an axial displacement of the bearing bolt 10. In an upper area of the swivel lever 40, a transverse support 41 can be arranged, on which at least one bolt connection 42 can be provided on the end face. According to FIG. 4, a reception 43 can be provided in the bolt connection 42 in particular for an actuating cylinder 70. Such an actuating cylinder 70 can be provided for example to orientate and hold a mast 80 of a construction machine 100.

At the lower end of the swivel lever 40, a further bolt connection 44 can be provided, on which for example a mast can be pivotably arranged at a lower end. The bolt connections according to FIG. 4 can be designed in particular as a bolt connection 20 according to the invention.

The invention claimed is:

1. Bolt connection with a single bearing bolt, which connects a first component and a second component pivotably to each other, wherein the bearing bolt extends through at least one first bearing eye on the first component and at least one second bearing eye on the second component, and wherein the bearing bolt, for releasing the connection, can be driven at an exit side out of the first bearing eye and the second bearing eye,
wherein
a protective receptacle is arranged on the exit side, which comprises a housing for preventing the bearing bolt from falling out and is designed to receive and accommodate the driven-out bearing bolt,
an adjusting body is fixed at a front end of the bearing bolt and is arranged in the protective receptacle,
the adjusting body is designed to change the position of the bearing bolt between the bolt connection and the protective receptacle,
the adjusting body is arranged axially with respect to the bearing bolt, and
the housing has an opening through which the adjusting body extends out of the housing of the protective receptacle.

2. Bolt connection according to claim 1,
wherein
the bearing bolt is arranged, after release of the connection, in the protective receptacle coaxially to the first bearing eye.

3. Bolt connection according to claim 1,
wherein
the bearing bolt is designed as a step bolt and has an area with a smaller diameter, which is formed at a side facing away from the protective receptacle, and has an area with a larger diameter, which is formed at a side facing towards the protective receptacle.

4. Bolt connection according to claim 1,
wherein
a position-securing means is arranged on the bolt connection, which can be moved radially to the bearing bolt.

5. Bolt connection according to claim 1,
wherein
a position-securing means has a pin lock, which engages in a positive locking way in a recess on the bearing bolt.

6. Bolt connection according to claim 1,
wherein
a hydraulic cylinder is arranged on the adjusting body, by means of which the adjusting body can be changed in its position.

7. Bolt connection according to claim 1,
wherein
a first position sensor is provided on the bolt connection, which is designed to determine the position of the bearing bolt in the bolt connection.

8. Bolt connection according to claim 1,
wherein
a second position sensor is provided on the bolt connection, which is designed to determine a coaxial position of the at least one first bearing eye relative to the at least one second bearing eye.

9. Bolt connection according to claim 8,
wherein
the second position sensor is connected to a control module, which is designed to release the bearing bolt, only after a coaxial orientation of the at least one first bearing eye and the at least one second bearing eye, for a movement of the bearing bolt to the bolt connection.

10. Construction machine for underground engineering,
wherein
at least one bolt connection according to claim 1 is provided.

11. Construction machine for underground engineering,
wherein
a mast is pivotably attached to a support device with the at least one bolt connection according to claim 1 is provided.

12. Swivel lever for a construction machine for underground engineering, which is designed to receive actuating cylinders for holding a mast,
wherein
at least one bolt connection according to claim 1 is provided.

13. Bolt connection according to claim 1,
wherein
a first area of the bearing bolt has a first diameter,
a second area of the bearing bolt has a second diameter, and
the first diameter is greater than the second diameter.

14. Bolt connection according to claim 13,
wherein
a third area of the bearing bolt has a third diameter, and the second diameter is greater than the third diameter.

15. Bolt connection according to claim 14,
wherein
a fourth area of the bearing bolt has a fourth diameter, the third diameter is the same as the fourth diameter.

16. Bolt connection according to claim 14,
wherein
a fourth area of the bearing bolt has a fourth diameter, the third diameter is greater than the fourth diameter.

* * * * *